Figure 1:
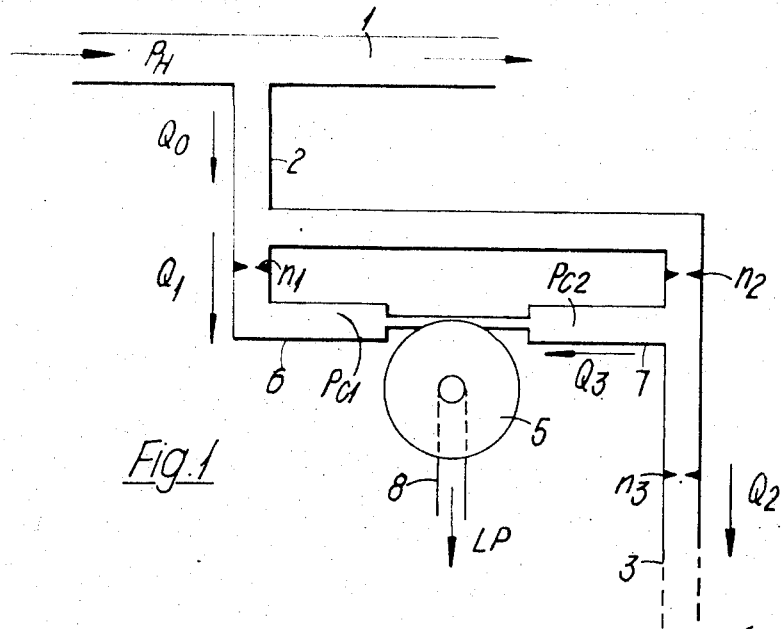

United States Patent [19]
Johnson et al.

[11] 3,756,285
[45] Sept. 4, 1973

[54] FLUID FLOW CONTROL APPARATUS

[75] Inventors: Christopher Linley Johnson, Burton-on-Trent; Hugh Francis Cantwell, Littleover, both of England

[73] Assignee: The Secretary of State for Defence, London, England

[22] Filed: Oct. 14, 1971

[21] Appl. No.: 189,235

[30] Foreign Application Priority Data
Oct. 22, 1970 Great Britain.................. 50,185/70

[52] U.S. Cl. ............................... 137/810, 137/812
[51] Int. Cl. ............................................... F15c 1/16
[58] Field of Search .................................. 137/81.5

[56] References Cited
UNITED STATES PATENTS
3,473,545  10/1969  Boyadijieff......................... 137/81.5
3,674,044  7/1972   Mayer................................. 137/81.5
3,621,655  11/1971  Hawes............................. 137/81.5 X
3,665,947  5/1972   Mayer................................. 137/81.5
3,592,309  7/1971   Joby................................... 137/81.5
3,592,213  7/1971   Smith............................. 137/81.5 X
3,598,137  8/1971   Glaze................................. 137/81.5
3,638,672  2/1972   Smith et al........................ 137/81.5
3,643,428  2/1972   Marshall et al................ 137/81.5 X
3,674,045  7/1972   Millman et al..................... 137/81.5

Primary Examiner—Samuel Scott
Attorney—Cushman, Darby, Lloyd J. Street et al.

[57] ABSTRACT

A fluid flow apparatus which will permit a varying quantity of fluid to be bled from a main fluid supply without substantially affecting the rate of flow of the main fluid supply.

10 Claims, 2 Drawing Figures

Inventors
CHRISTOPHER LINLEY JOHNSON
HUGH FRANCIS CANTWELL
By
Cushman Darby Cushman
Attorneys

FLUID FLOW CONTROL APPARATUS

This invention relates to fluid flow control apparatus and is particularly, although not exclusively, suitable for use in the fuel control system of a gas turbine engine.

It is often the practice in a gas turbine engine to bleed fuel from the main fuel supply to the engine and use it to operate various engine ancillaries such as servos, hydraulic motors and the like.

Such ancillaries are not in use constantly and thus the demand for fuel to operate ancillaries varies. Hence the amount of fuel bled from the main supply must also be varied. This causes a fluctuating demand for fuel upstream of the bleed point which must be compensated for by adjustments in the delivery rate of the fuel pump, either by alterations in speed, stroke, or spill rate dependent upon the type of pump used.

If the change in demand for fuel in the main supply is rather rapid the pump may not be able to change its delivery rate quickly enough due to the lag inherent in some types of pump and, if the demand for fuel by the ancillaries increases rapidly it is possible for the main fuel supply to the engine to be reduced temporarily until the pump output has been suitably increased.

It is the object of the present invention to provide a fluid flow apparatus which will permit a varying quantity of fluid to be bled from a main fluid supply without substantially affecting the main fluid supply.

According to the present invention fluid flow control apparatus comprises duct means adapted to communicate with a main fluid supply line, a discharge duct communicating with the duct means, a bleed duct in communication with the duct means and control means adapted to control the proportions of fluid flowing to the discharge duct and to the bleed duct in accordance with the pressure in the discharge duct whereby the rate of flow of fluid along the bleed duct is increased and the rate of flow of fluid along the discharge duct is decreased as the pressure in the discharge duct increases.

Preferably the bleed duct communicates with the duct means upstream of the communication between the discharge duct and the duct means.

Preferably the control means comprises a vortex valve (as hereinafter defined) arranged to communicate with both the duct means and the bleed duct.

Preferably the vortex valve has at least one tangential port connected to the duct means, and a central port which is connected to the bleed duct.

Preferably the vortex valve has two tangential ports which are mutually opposed and are connected to the duct means although the vortex valve may have one tangential port and one radial port, both being connected to the duct means, the tangential port being connected to the duct means upstream of the radial port.

Preferably the two tangential ports of the tangential and the radial port are connected to the duct means one each side of a restrictor arranged in the duct means.

A further restrictor may be located between the duct means and the port connected to the duct means upstream of the restrictor.

In this specification the term vortex is applied to a cylindrical chamber having at least one port in the circumferential wall of the chamber, and a port substantially in the centre of the end wall of the chamber and means for preventing or promoting the occurence of a vortex in the cylindrical chamber.

Figure 2:
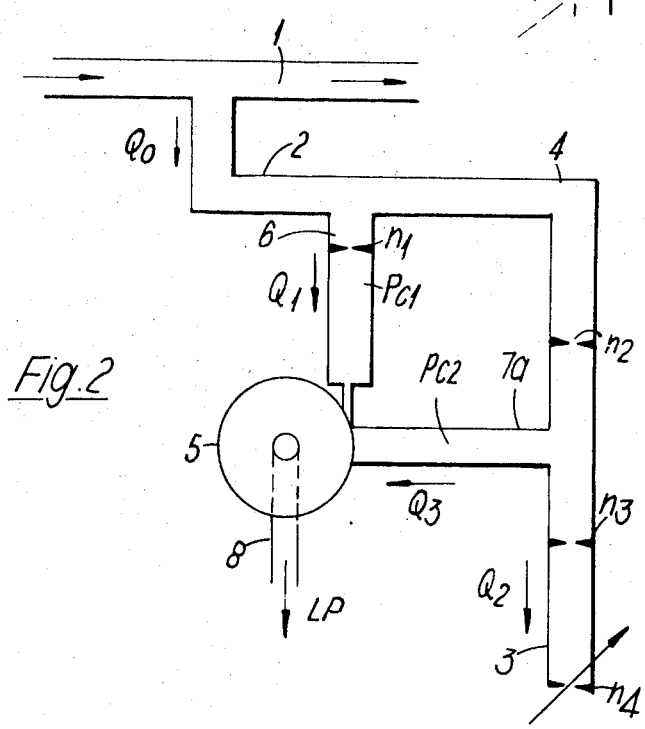

Embodiments of the invention will now be described by way of example only with reference to the accompanying drawings in which;

FIG. 1 illustrates diagrammatically a fluid control apparatus in accordance with the invention and, FIG. 2 illustrates an alternative arrangement to the one shown in FIG. 1.

Referring to FIG. 1 a main fluid supply duct 1, which may for example be the main fuel supply line in a gas turbine engine, is provided with an offtake duct 2 which, via a connecting duct 4, supplies a discharge duct 3 which leads to a servo system for operating the gas turbine engine exhaust nozzle represented by $n_4$.

It will be seen that the rate of flow of fuel $Q_2$ through the discharge duct 3 and the pressure existing in the discharge duct 3 will be dependent upon the setting of $n_4$.

A restrictor $n_2$ is located in the connecting duct 4, and a further restrictor $n_3$, is located in the discharge duct 3.

A vortex valve 5 which comprises a cylindrical chamber is connected to the offtake duct 2 via a duct 6 and to the connecting duct 4 via a duct 7.

The ducts 6 and 7 are connected to the vortex valve 5 tangentially into the circumferential wall of the vortex valve. A bleed duct 8 leads from the centre of one end wall of the vortex valve and is led to a low pressure portion of the fuel system. A restrictor $n_1$ is located in the duct 6.

The arrangement is such and the restrictors $n_1$, $n_2$ and $n_3$ and the tangential port restrictions into the vortex valve 5 are sized so that when $Q_2$ is at the minimum flow required the pressures Pc1 and Pc2 in the ducts 6 and 7 will be equal. The rates of flow of fuel $Q_1$ and $Q_3$ in the ducts 6 and 7 will thus be equal and the fuel will flow straight through the vortex valve 5 and into the bleed duct 8.

As the rate of flow $Q_2$ in the discharge duct 3 is increased above its minimum value the pressure Pc2 in duct 7 will fall relative to the pressure Pc1 in duct 6 and the fuel will now enter the vortex chamber 5 tangentially, so creating a vortex in the chamber. The flow to the bleed duct 8 and the flow $Q_3$ will be reduced, the vortex valve gain characteristic being arranged so that the reduction in $Q_3$ will match the reduction in $Q_2$ (and any change in the flow $Q_1$ in duct 6). The total rate of flow of fuel $Q_0$ through the offtake duct will thus remain substantially constant.

In reverse, as the demand for fuel reduces, thus reducing $Q_2$, the pressure Pc2 increases, the vortex valve is reduced and the flow through the vortex valve increases thus increasing $Q_3$.

Another embodiment of the invention is shown in FIG. 2.

The method of operation is similar but the duct 7 is replaced by a radial duct 7a. Again as $Q_2$ increases the pressure Pc2 in the duct 7a tends to drop and a greater pressure differential exists between Pc1 and Pc2. The vortex strength in the vortex valve 5 increases and $Q_3$ reduces.

If it is important that the ducts 4 and 3 should be supplied with minimum pressure loss orifices, the restrictors $n_2$ and $n_3$ could be replaced by a venturi with the duct 7 or 7a tapped from the throat of the venturi.

The restrictor $n_3$ is not essential but is provided to limit the maximum flow $Q_2$ to a value at which the apparatus still function correctly.

Whilst the apparatus has been described in connection with the fuel control system of a gas turbine engine it is, of course, suitable for any apparatus in which it is required to bleed a varying quantity of fluid from a fluid supply line without substantially affecting the flow through the fluid supply line.

We claim:

1. Fluid flow control apparatus comprising:
a main fluid supply line;
duct means;
means connecting said duct means directly to said main fluid supply line;
a discharge duct;
means connecting said discharge duct directly to said duct means;
a bleed duct;
means connecting said bleed duct to said duct means;
said main fluid supply line and said duct means carrying a continuous flow of fluid to said discharge duct and said bleed duct when the apparatus is in use; and
control means, said control means being arranged to control the rate of flow of fluid flowing through said bleed duct from said continuous flow through said duct means in accordance with pressure in said discharge duct whereby the rate of flow of fluid in said bleed duct is increased and the rate of flow of fluid in said discharge duct decreases as said pressure in said discharge duct increases, and the rate of flow of fluid in said bleed duct is decreased and the rate of flow of fluid in said discharge duct increases as said pressure in said discharge duct decreases.

2. Fluid flow control apparatus as claimed in claim 1 wherein said bleed duct is connected to said duct means upstream of the connection between said discharge duct and said duct means.

3. Fluid flow control apparatus as claimed in claim 2 wherein said control means comprises a vortex valve, means connecting said vortex valve with both said duct means and said bleed duct.

4. Fluid flow control apparatus as claimed in claim 3 wherein said vortex valve has at least one tangential port and means connecting said at least one tangential port to said duct means, and said vortex valve has a central port and means connecting said centrol port to said bleed duct.

5. Fluid flow control apparatus as claimed in claim 4 wherein said vortex valve has two tangential ports which are mutually opposed and means connecting said two tangential ports to said duct means.

6. Fluid flow control apparatus as claimed in claim 5 wherein said two tangential ports are connected to said duct means one on each side of a restrictor arranged in said duct means.

7. Fluid flow control apparatus as claimed in claim 6 wherein a further restrictor is located between the said duct means and said tangential port connected to said duct means upstream of said firstmentioned restrictor.

8. Fluid flow control apparatus as claimed in claim 4 wherein said vortex valve has one tangential port and one radial port and means connecting both said ports to said duct means, said tangential port being connected to said duct means upstream of said radial port.

9. Fluid flow control apparatus as claimed in claim 8 wherein said tangential port and said radial port are connected to said duct means one on each side of a restrictor arranged in said duct means.

10. Fluid flow control apparatus as claimed in claim 9 wherein a further restrictor is located between said duct means and said tangential port.

* * * * *